US010379402B2

(12) United States Patent
Chen

(10) Patent No.: US 10,379,402 B2
(45) Date of Patent: Aug. 13, 2019

(54) PIXEL STRUCTURE OF DISPLAY ARRAY SUBSTRATE AND DISPLAY DEVICE USING THE SAME

(71) Applicants: HKC Corporation Limited, Shenzhen, Guangdong (CN); Chongqing HKC Optoelectronics Technology Co., Limited, Chongqing (CN)

(72) Inventor: Yu-Jen Chen, Chongqing (CN)

(73) Assignees: HKC CORPORATION LIMITED, Shenzhen, Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 43 days.

(21) Appl. No.: 15/555,344

(22) PCT Filed: Feb. 26, 2017

(86) PCT No.: PCT/CN2017/074905
§ 371 (c)(1),
(2) Date: Sep. 1, 2017

(87) PCT Pub. No.: WO2018/082228
PCT Pub. Date: May 11, 2018

(65) Prior Publication Data
US 2018/0348579 A1    Dec. 6, 2018

(30) Foreign Application Priority Data
Nov. 7, 2016    (CN) .......................... 2016 1 0976195

(51) Int. Cl.
*G02F 1/1337*        (2006.01)
*G02F 1/1343*        (2006.01)
(Continued)

(52) U.S. Cl.
CPC .. *G02F 1/133707* (2013.01); *G02F 1/134309* (2013.01); *G02F 1/136286* (2013.01);
(Continued)

(58) Field of Classification Search
CPC ......... G02F 1/134309; G02F 1/136286; G02F 1/133528; G02F 1/133707
See application file for complete search history.

(56) References Cited

U.S. PATENT DOCUMENTS 9,568,773 B2 * 2/2017 Shih .................. G02F 1/134309
2008/0143897 A1 * 6/2008 Chang ............... G02F 1/134363
349/33
(Continued)

FOREIGN PATENT DOCUMENTS

CN    1101131522 A    2/2008
CN    101976007 A    2/2011
(Continued)

OTHER PUBLICATIONS

International Search Report for PCT/CN2017/074905, dated Aug. 2, 2017.

*Primary Examiner* — Dung T Nguyen
(74) *Attorney, Agent, or Firm* — Juan Carlos A. Marquez; Marquez IP Law Office, PLLC

(57) ABSTRACT

This application provides a pixel structure of display array substrate and a display device applied thereto. The pixel structure of display array substrate includes a plurality of pixel units arranged in an array manner. Each pixel unit includes a first subpixel, a second subpixel, and a fourth subpixel. Each pixel unit further includes: a first subpixel electrode and a second subpixel electrode, respectively located in the first subpixel and the second subpixel; and a fourth subpixel electrode, where the fourth subpixel electrode includes a first pixel electrode, a second pixel electrode, a third pixel electrode, and a fourth pixel electrode
(Continued)

located in four areas of the fourth subpixel, respectively, and each the first pixel electrode, the second pixel electrode, the third pixel electrode, and the fourth pixel electrode are divided into at least two compensation area.

16 Claims, 15 Drawing Sheets

(51) Int. Cl.
*G02F 1/1362* (2006.01)
*G02F 1/1335* (2006.01)

(52) U.S. Cl.
CPC .. *G02F 1/133528* (2013.01); *G02F 2201/123* (2013.01); *G09G 2300/0439* (2013.01); *G09G 2320/0233* (2013.01)

(56) References Cited

U.S. PATENT DOCUMENTS

2014/0327864 A1　11/2014　Cheng et al.
2015/0168793 A1*　6/2015　Oh ................... G02F 1/133707
　　　　　　　　　　　　　　　　　　　　349/110

FOREIGN PATENT DOCUMENTS

| CN | 1102768443 A | 11/2012 |
| CN | 104849922 A | 8/2015 |
| CN | 105182631 A | 12/2015 |

* cited by examiner

PIXEL STRUCTURE OF DISPLAY ARRAY SUBSTRATE AND DISPLAY DEVICE USING THE SAME

BACKGROUND

Technical Field

This application relates to an electrode design method, and in particular, to a pixel structure of display array substrate and a display device applied thereto.

Related Art

Generally, mura is caused by uneven brightness distribution on a display screen. In a pixel design of a vertical alignment (VA) type/in-plane switching (IPS) type/fringe field switching (FFS) type, a pixel electrode is generally designed to have a slit form, and control of a line width of the pixel electrode greatly affects liquid crystal efficiency. In a process of a pixel design of a display array substrate, a segment difference may occur between subpixels having different colors. In the process, because of a severe segment difference of a subpixel (because of a width drop of a flat layer), it is relatively difficult to control a line width of an indium tin oxide (ITO) slit in a process of exposure, development, and etching. Therefore, a problem of unstable transmittance is easily caused.

SUMMARY

To resolve the foregoing technical problem, an objective of this application is to provide a pixel structure of display array substrate, thereby effectively resolving a mura problem, and mitigating a brightness difference caused by a variation in an ITO slit of a fourth subpixel.

The following technical solutions are used to achieve the objective of this application and resolve the technical problem of this application. According to this application, a pixel structure of display array substrate is provided, comprising a plurality of pixel units arranged in an array manner, where each of the pixel units comprises a first subpixel, a second subpixel, and a fourth subpixel, and each pixel unit further comprises: a first subpixel electrode and a second subpixel electrode, respectively located in the first subpixel and the second subpixel; and a fourth subpixel electrode comprising a first pixel electrode, a second pixel electrode, a third pixel electrode, and a fourth pixel electrode located in four areas of the fourth subpixel, respectively, and each of the first pixel electrode, the second pixel electrode, the third pixel electrode, and the fourth pixel electrode are divided into at least two compensation areas configured to correct electrode line widths of the at least two compensation areas, so as to mitigate a brightness difference caused by a variation in a slit of the fourth subpixel electrode.

A liquid crystal display panel comprises a first substrate, a second substrate disposed opposite the first substrate, and a liquid crystal layer disposed between the first substrate and the second substrate, and further comprises a pixel structure of display array substrate disposed between the first substrate and the second substrate. Moreover, the liquid crystal display panel further comprises a first polarizer disposed on an outer surface of the first substrate and a second polarizer disposed on an outer surface of the second substrate, where a polarization direction of the first polarizer and a polarization direction of the second polarizer are parallel.

A display apparatus comprises a backlight module and further comprises the foregoing liquid crystal display panel.

The following technical measures may be used in this application to further resolve the technical problem of this application.

In an embodiment of this application, the first pixel electrode is divided into three compensation areas made up of a first inner-layer pixel electrode, a first intermediate-layer pixel electrode, and a first outer-layer pixel electrode, and electrode line widths of the first inner-layer pixel electrode, respectively, the first intermediate-layer pixel electrode, and the first outer-layer pixel electrode are 80% to 120% of a line width of the first subpixel electrode and the second subpixel electrode.

In an embodiment of this application, the second pixel electrode is divided into three compensation areas made up of a second inner-layer pixel electrode, a second intermediate-layer pixel electrode, and a second outer-layer pixel electrode, and electrode line widths of the second inner-layer pixel electrode, the second intermediate-layer pixel electrode, and the second outer-layer pixel electrode are 80% to 120% of a line width of the first subpixel electrode and the second subpixel electrode.

In an embodiment of this application, the third pixel electrode is divided into three compensation areas made up of a third inner-layer pixel electrode, a third intermediate-layer pixel electrode, and a third outer-layer pixel electrode, and electrode line widths of the third inner-layer pixel electrode, the third intermediate-layer pixel electrode, and the third outer-layer pixel electrode are 80% to 120% of a line width of the first subpixel electrode and the second subpixel electrode.

In an embodiment of this application, the fourth pixel electrode is divided into three compensation areas made up of a fourth inner-layer pixel electrode, a fourth intermediate-layer pixel electrode, and a fourth outer-layer pixel electrode, and electrode line widths of the fourth inner-layer pixel electrode, the fourth intermediate-layer pixel electrode, and the fourth outer-layer pixel electrode are 80% to 120% of a line width of the first subpixel electrode and the second subpixel electrode.

In an embodiment of this application, designs of electrode line widths of the second pixel electrode, the third pixel electrode, and the fourth pixel electrode are the same as a design of the first pixel electrode.

In an embodiment of this application, a form of pixel division of the fourth subpixel electrode is a rectangle, a circle or a rhombus.

In an embodiment of this application, a form of a compensation area electrode line width is a symmetrical radial pixel electrode with a rectangular outer edge.

In an embodiment of this application, a form of a compensation area electrode line width is a symmetrical radial pixel electrode with inserted strip rectangles.

In an embodiment of this application, a form of a compensation area electrode line width is a symmetrical radial pixel electrode with a circular outer edge or a symmetrical radial pixel electrode with inserted circles.

A beneficial effect of this application is: pixels of a pixel array display screen of a display array substrate are improved, and therefore insensitivity to a process variation is achieved. For a problem extended from a novel process of a pixel array of a display array substrate, this design provides a method for feeding back, correcting, and compensating for a line width, thereby mitigating a brightness difference caused by an ITO slit of a fourth subpixel.

DETAILED DESCRIPTION

Figure 1A:
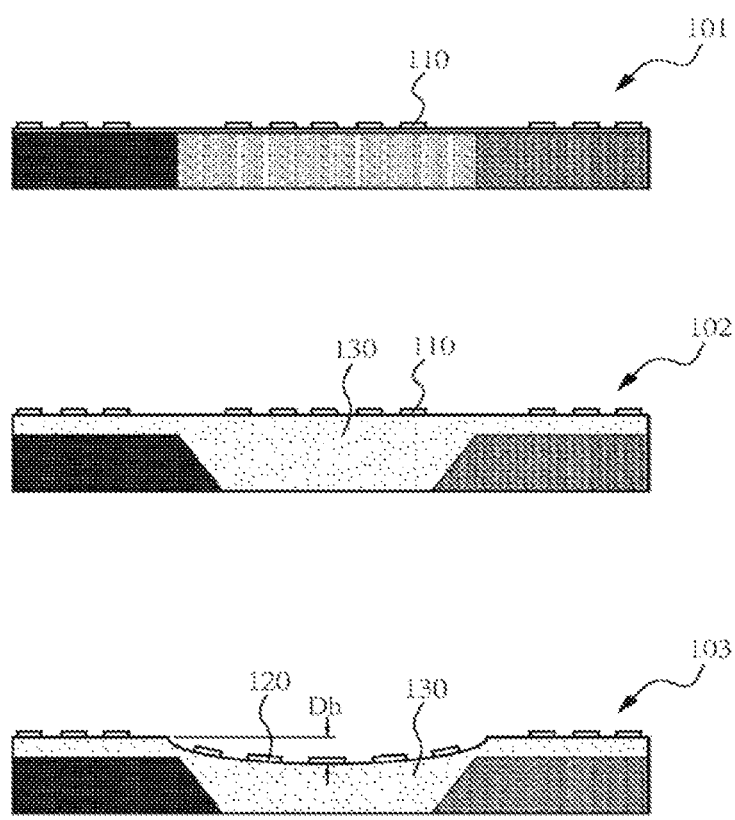
FIG. 1a is a schematic diagram of a segment difference of a white pixel of pixels of a display array substrate according to an embodiment of this application.

The following embodiments are described with reference to the accompanying drawings used to exemplify specific embodiments for implementation of this application. Terms about directions mentioned in this application, such as "on", "below", "front", "back", "left", "right", "in", "out", and "side surface" merely refer to directions of the accompanying drawings. Therefore, the used terms about directions are used to describe and understand this application, and are not intended to limit this application.

The accompanying drawings and the description are considered to be essentially exemplary, rather than limitative. In figures, units with similar structures are represented by using a same reference number. In addition, for understanding and ease of description, a size and a thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a substrate is described to be "on" "another component", the component may be directly on the another component, or there may be an intermediate component.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of a gravity direction.

To further describe the technical means adopted in this application to achieve the preset invention objective and effects thereof, specific implementations, structures, features, and effects of a pixel structure of display array substrate and a display device using the same are provided in this application are described in detail below with reference to the accompanying drawings and preferred embodiments.

A liquid crystal display device of this application may include a backlight module and a liquid crystal display panel. The liquid crystal display panel may include a thin film transistor (TFT) substrate, a color filter (CF) substrate, and a liquid crystal layer formed between the two substrates.

In an embodiment of this application, the liquid crystal display panel of this application may be a display panel with a curved surface, and the liquid crystal display panel of this application may be a display apparatus with a curved surface.

In an embodiment of this application, the TFT substrate and the CF substrate of this application may be formed on a same substrate.

The liquid crystal display device in a VA mode is, for example, a patterned VA (PVA) liquid crystal display or a multi-domain VA (MVA) liquid crystal display device. In the PVA liquid crystal display, a fringing field effect and a compensating plate are used to achieve an effect of a wide viewing angle. In the MVA liquid crystal display device, a pixel is divided into a plurality of areas, and a protrusion or a specific pattern structure is used, so that liquid crystal molecules located in different areas tilt in different directions, so as to achieve a wide viewing angle and achieve an objective of increasing transmittance.

FIG. 1a is a schematic diagram of a segment difference of a white pixel of pixels of a display array substrate according to an embodiment of this application. Referring to FIG. 1a, a difference between an ideal process state 102 and an actual process state 103 is a severe segment difference of a white subpixel (because of a width drop Dh of a flat layer 130), and because of a line width (the line width becomes an uneven slit line width 120), it is relatively difficult to control an ITO slit 110 in a process of exposure, development, and etching. Therefore, a problem of unstable transmittance is easily caused.

Figure 1B:
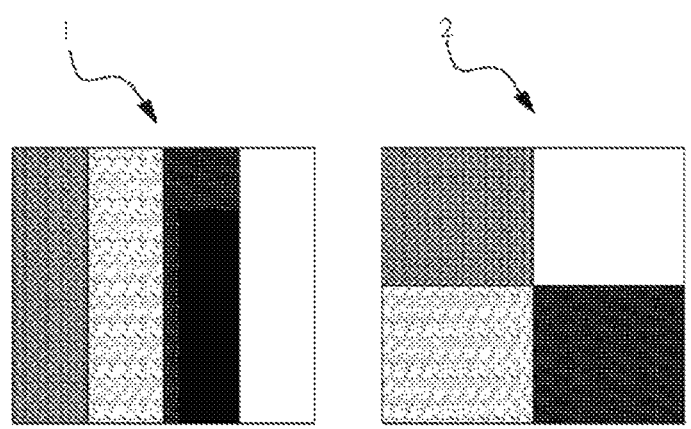
FIG. 1b is a schematic diagram of types of pixels of a display array substrate according to an embodiment of this application.

Referring to FIG. 1b, FIG. 1b is a schematic diagram of types of pixels of a display array substrate according to an embodiment of this application. The types of pixels of the display array substrate may include format types of a display array substrate pixel having a strip shape 1 and a display array substrate pixel having a rectangular shape 2.

Figure 2:
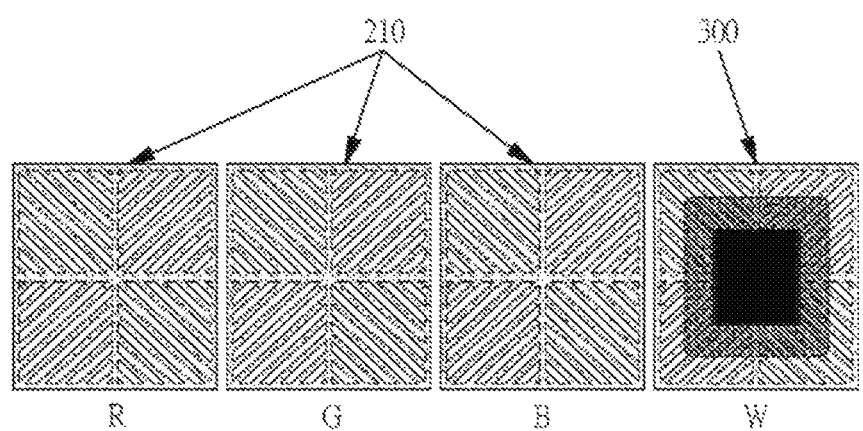
FIG. 2 is a schematic diagram of a pixel structure of display array substrate having a fourth subpixel electrode, a first subpixel electrode, a second subpixel electrode, and a third subpixel electrode according to an embodiment of this application.
Figure 3A:
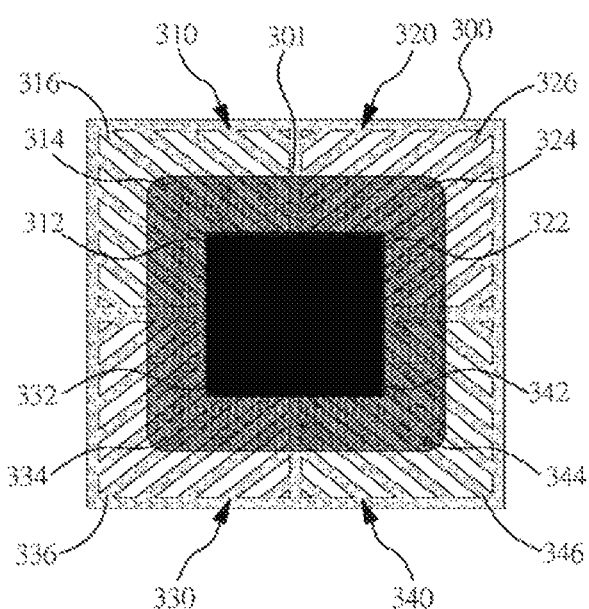
FIG. 3a is a schematic diagram of pixel division using a rectangle of a fourth subpixel electrode according to an embodiment of this application.

FIG. 2 is a schematic diagram of a pixel structure of display array substrate having a fourth subpixel electrode 300, a first subpixel electrode 210, a second subpixel electrode 210, and a third subpixel electrode 210 according to an embodiment of this application. FIG. 3a is a schematic diagram of pixel division using a rectangle 301 of a fourth subpixel electrode 300 according to an embodiment of this application. Referring to FIG. 2 and FIG. 3a, this application provides a pixel structure of display array substrate, including a plurality of pixel units arranged in an array manner. Each pixel unit may include a first subpixel (for example, a red subpixel), a second subpixel (for example, a green subpixel), a third subpixel (for example, a blue subpixel), and a fourth subpixel (for example, a white subpixel). Each pixel unit further includes a fourth subpixel electrode 300 and a first subpixel electrode 210 and a second subpixel electrode 210. The fourth subpixel electrode 300 includes a first pixel electrode 310, a second pixel electrode 320, a third pixel electrode 330, and a fourth pixel electrode 340 located in four areas of the fourth subpixel, respectively, The first pixel electrode 310, the second pixel electrode 320, the third pixel electrode 330, and the fourth pixel electrode 340 are divided into at least two compensation areas configured to correct electrode line widths of the at least two compensation areas, so as to mitigate a brightness difference caused by a variation in a slit of the fourth subpixel electrode 300. The first subpixel electrode 210 and the second subpixel electrode 210 are respectively located in the first subpixel and the second subpixel.

Figure 3B:
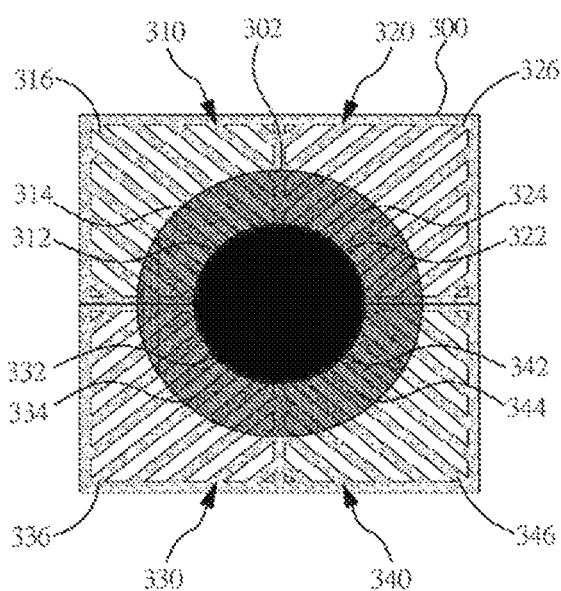
FIG. 3b is a schematic diagram of pixel division using a circle of a fourth subpixel electrode according to an embodiment of this application.
Figure 3C:
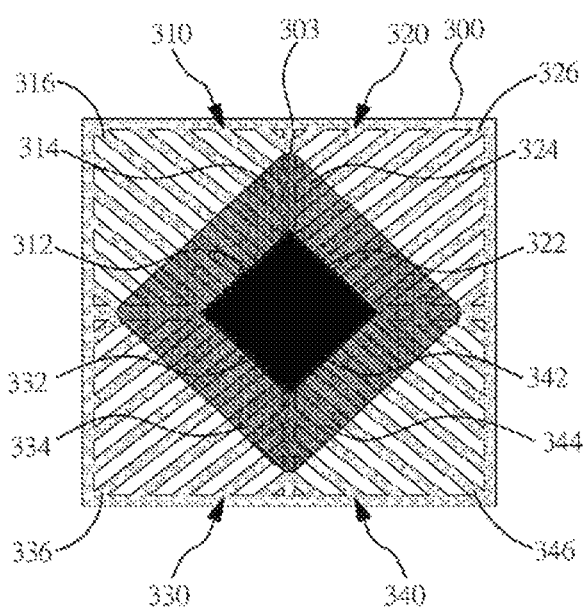
FIG. 3c is a schematic diagram of pixel division using a rhombus of a fourth subpixel electrode according to an embodiment of this application.
Figure 4:
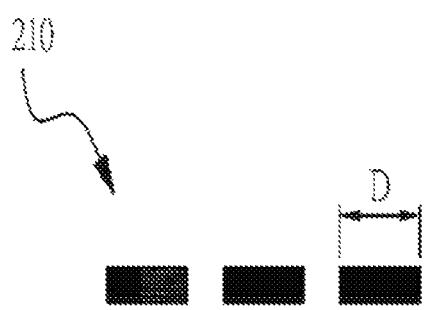
FIG. 4 is a schematic diagram of a compensation electrode line width of an electrode structure of an RGB pixel according to an embodiment of this application.
Figure 4A:
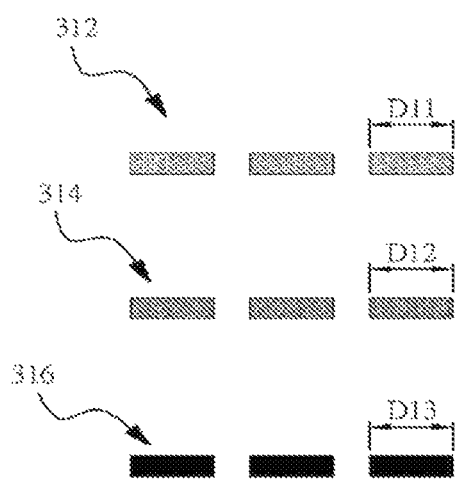
FIG. 4a is a schematic diagram of a compensation electrode line width of an electrode structure of a white pixel according to an embodiment of this application.
Figure 4B:
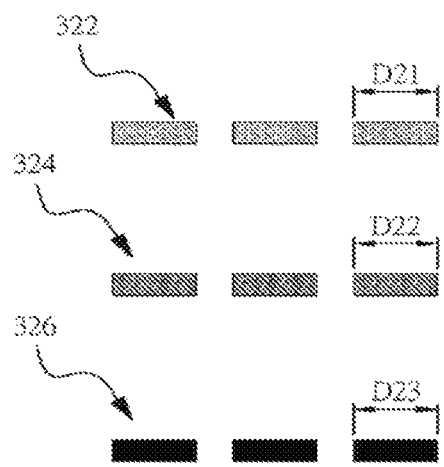
FIG. 4b is a schematic diagram of a compensation electrode line width of an electrode structure of a white pixel according to another embodiment of this application.
Figure 4C:
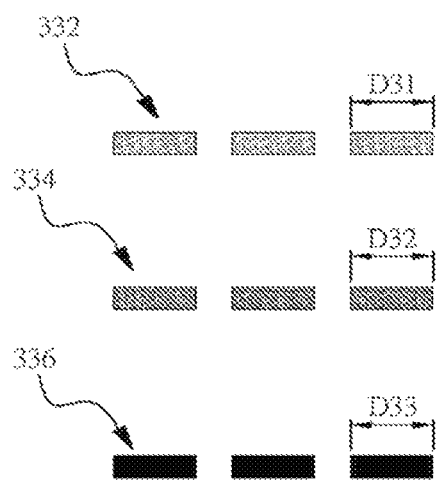
FIG. 4c is a schematic diagram of a compensation electrode line width of an electrode structure of a white pixel according to still another embodiment of this application.
Figure 4D:
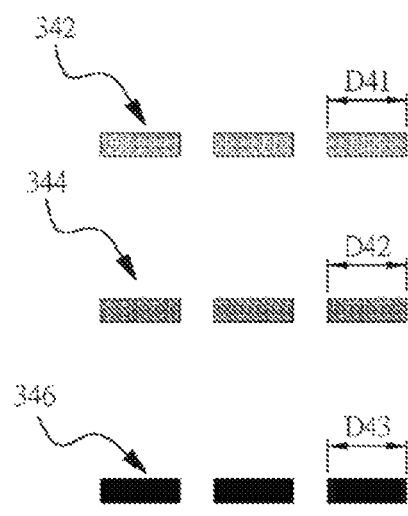
FIG. 4d is a schematic diagram of a compensation electrode line width of an electrode structure of a white pixel according to yet another embodiment of this application.

FIG. 3b is a schematic diagram of pixel division using a circle 302 of a fourth subpixel electrode 300 of a pixel structure of display array substrate according to an embodiment of this application. FIG. 3c is a schematic diagram of pixel division using a rhombus 303 of a fourth subpixel electrode 300 of a pixel structure of display array substrate according to an embodiment of this application. FIG. 4 is a schematic diagram of a compensation electrode line width of an electrode structure of an RGB pixel according to an embodiment of this application. FIG. 4a is a schematic diagram of a compensation electrode line width of an electrode structure of a fourth pixel according to an embodiment of this application. FIG. 4b is a schematic diagram of a compensation electrode line width of an electrode structure of a fourth pixel according to another embodiment of this application. FIG. 4c is a schematic diagram of a compensation electrode line width of an electrode structure of a fourth pixel according to still another embodiment of this application. FIG. 4d is a schematic diagram of a compensation electrode line width of an electrode structure of a fourth pixel according to yet another embodiment of this application. Please refer to FIG. 3a, FIG. 3b, FIG. 3c, FIG. 4, FIG. 4a, FIG. 4b, FIG. 4c, and FIG. 4d. In an embodiment of this application, the first pixel electrode 310 is divided into three compensation areas made up of a first inner-layer pixel electrode 312, a first intermediate-layer pixel electrode 314, and a first outer-layer pixel electrode 316. Electrode line widths of the first inner-layer pixel electrode 312, the first intermediate-layer pixel electrode 314, and the first outer-layer pixel electrode 316 are, for example, 80% to 120% of a line width D of the first subpixel electrode 210 and the second subpixel electrode 210, for example, D11, D12, and D13, D11~D3 are in the range between of 0.8 D to 1.2 D.

In an embodiment of this application, the second pixel electrode 320 is divided into three compensation areas made up of a second inner-layer pixel electrode 322, a second intermediate-layer pixel electrode 324, and a second outer-layer pixel electrode 326. Electrode line widths of the second inner-layer pixel electrode 322, the second intermediate-layer pixel electrode 324, and the second outer-layer pixel electrode 326 are, for example, 80% to 120% of a line width D of the first subpixel electrode 210 and the second subpixel electrode 210, for example, D21, D22, and D23, D21~D23 are in the range between of 0.8 D to 1.2 D.

In an embodiment of this application, the third pixel electrode 330 is divided into three compensation areas made up of a third inner-layer pixel electrode 332, a third intermediate-layer pixel electrode 334, and a third outer-layer pixel electrode 336. Electrode line widths of the third inner-layer pixel electrode 332, the third intermediate-layer pixel electrode 334, and the third outer-layer pixel electrode 336 are, for example, 80% to 120% of a line width D of the first subpixel electrode 210 and the second subpixel electrode 210, for example, D31, D32, and D33, D31~D33 are in the range between of 0.8 D to 1.2 D.

In an embodiment of this application, the fourth pixel electrode 340 is divided into three compensation areas made up of a fourth inner-layer pixel electrode 342, a fourth intermediate-layer pixel electrode 344, and a fourth outer-layer pixel electrode 346. Electrode line widths of the fourth inner-layer pixel electrode 342, the fourth intermediate-layer pixel electrode 344, and the fourth outer-layer pixel electrode 346 are, for example, 80% to 120% of a line width D of the first subpixel electrode 210 and the second subpixel electrode 210, for example, D41, D42, and D43, D41~D43 are in the range between of 0.8 D to 1.2 D.

Designs of electrode line widths of the second pixel electrode 320, the third pixel electrode 330, and the fourth pixel electrode 340 are the same as a design of the first pixel electrode 310.

A form of pixel division of the fourth subpixel electrode is a rectangle 301, a circle 302 or a rhombus 303, or another pattern.

Figure 5A:
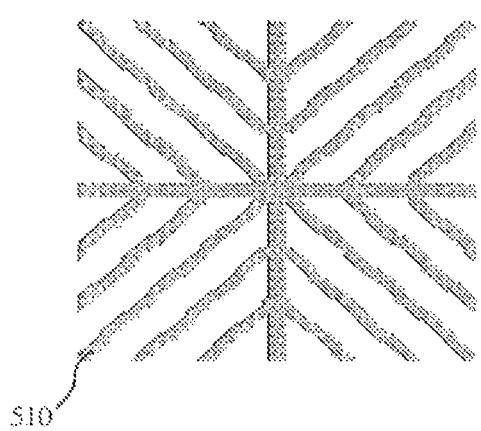
FIG. 5a is a schematic diagram of a compensation area electrode line width of a pixel structure of display array substrate according to an embodiment of this application.
Figure 5B:
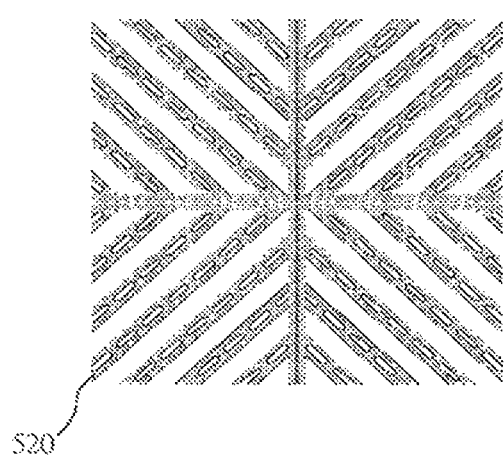
FIG. 5b is a schematic diagram of a compensation area electrode line width of a pixel structure of display array substrate according to another embodiment of this application.
Figure 5C:
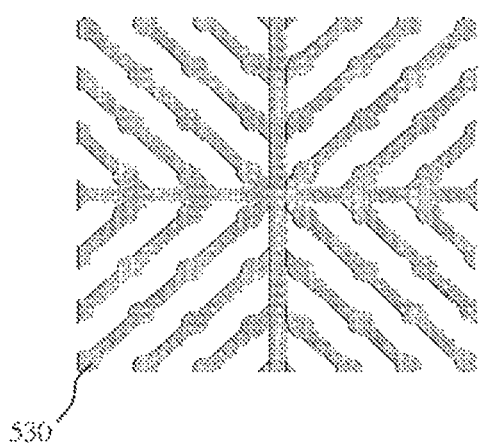
FIG. 5c is a schematic diagram of a compensation area electrode line width of a pixel structure of display array substrate according to still another embodiment of this application.
Figure 5D:
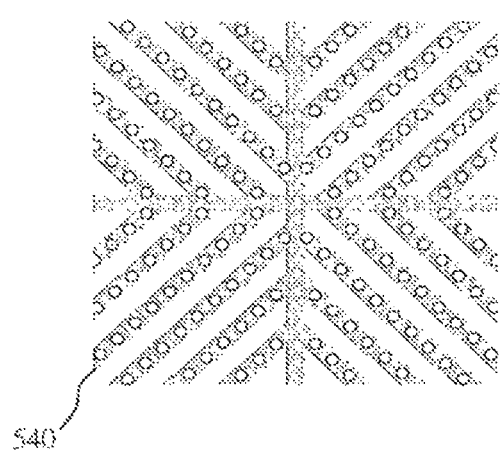
FIG. 5d is a schematic diagram of a compensation area electrode line width of a pixel structure of display array substrate according to yet another embodiment of this application.

FIG. 5a is a schematic diagram of a compensation area electrode line width of a pixel structure of display array substrate according to an embodiment of this application. FIG. 5b is a schematic diagram of a compensation area electrode line width of a pixel structure of display array substrate according to another embodiment of this application. FIG. 5c is a schematic diagram of a compensation area electrode line width of a pixel structure of display array substrate according to still another embodiment of this application. FIG. 5d is a schematic diagram of a compensation area electrode line width of a pixel structure of display array substrate according to yet another embodiment of this application. Referring to FIG. 5a, FIG. 5b, FIG. 5c, and FIG. 5d, in some embodiments of this application, the pixel structure of display array substrate may further include four forms of compensation area electrode line widths: a symmetrical radial pixel electrode 510 with a rectangular outer edge, a symmetrical radial pixel electrode 520 with inserted strip rectangles, a symmetrical radial pixel electrode 530 with a circular outer edge or a symmetrical radial pixel electrode 540 with inserted circles. However, this application is not limited thereto. In another embodiment, the pixel structure of display array substrate of this application may include a symmetrical radial pixel electrode with another pattern.

In an embodiment of this application, a liquid crystal display panel of this application includes: a first substrate, a second substrate disposed opposite the first substrate, and a liquid crystal layer disposed between the first substrate and the second substrate. The liquid crystal display panel further includes a plurality of pixel units arranged in an array manner (as shown in FIG. 2 and FIG. 3a). Each pixel unit includes a first subpixel, a second subpixel, and a fourth subpixel. Each pixel unit further includes: a fourth subpixel electrode and a first subpixel electrode and a second subpixel electrode. The fourth subpixel electrode includes a first pixel electrode, a second pixel electrode, a third pixel electrode, and a fourth pixel electrode located in four areas of the fourth subpixel, respectively. Each of the first pixel electrode, the second pixel electrode, the third pixel electrode, and the fourth pixel electrode are divided into at least two compensation areas configured to correct electrode line widths of the at least two compensation areas, so as to mitigate a brightness difference caused by a variation in a slit of the fourth subpixel electrode. The first subpixel electrode and the second subpixel electrode are respectively located in the first subpixel and the second subpixel. Each pixel unit is disposed between the first substrate and the second substrate. Moreover, the liquid crystal display panel further includes a first polarizer disposed on an outer surface of the first substrate and a second polarizer disposed on an outer surface of the second substrate. A polarization direction of the first polarizer and a polarization direction of the second polarizer are parallel.

In an embodiment of this application, a display apparatus of this application includes a backlight module and further includes a liquid crystal display panel, including: a first substrate, a second substrate disposed opposite the first substrate, and a liquid crystal layer disposed between the first substrate and the second substrate. The liquid crystal display panel further includes a plurality of pixel units arranged in an array manner (as shown in FIG. 2 and FIG. 3a). Each pixel unit includes a first subpixel, a second subpixel, and a fourth subpixel. Each pixel unit further includes: a fourth subpixel electrode and a first subpixel electrode and a second subpixel electrode. The fourth subpixel electrode includes a first pixel electrode, a second pixel electrode, a third pixel electrode, and a fourth pixel electrode located in four areas of the fourth subpixel, respectively. Each of the first pixel electrode, the second pixel electrode, the third pixel electrode, and the fourth pixel electrode are divided into at least two compensation areas configured to correct electrode line widths of the at least two compensation areas, so as to mitigate a brightness difference caused by a variation in a slit of the fourth subpixel electrode. The first subpixel electrode and the second subpixel electrode are respectively located in the first subpixel and the second subpixel. Each pixel unit is disposed between the first substrate and the second substrate. Moreover, the liquid crystal display panel further includes a first polarizer disposed on an outer surface of the first substrate and a second polarizer disposed on an outer surface of the second substrate. A polarization direction of the first polarizer and a polarization direction of the second polarizer are parallel.

A beneficial effect of this application is: pixels of a pixel array display screen of a display array substrate are improved, and therefore insensitivity to a process variation is achieved. For a problem extended from a novel process of a pixel array of a display array substrate, this design provides a method for feeding back, correcting, and compensating for a line width, thereby mitigating a brightness difference caused by an ITO slit of a fourth subpixel. Therefore, for a difference of an electrode line width caused in a process of exposure because of a large segment difference, by means of control of adjustment of the electrode line width, beforehand compensation can be performed, thereby effectively reducing uneven transmittance of pixels and reducing a risk of electrode breakage.

Terms such as "in some embodiments" and "in various embodiments" are repeatedly used. Usually, the terms do not refer to a same embodiment; but they may also refer to a same embodiment. Words such as "comprise", "have", "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some equivalent variations or modifications according to the foregoing disclosed technical content without departing from the scope of the technical solutions of this application to obtain equivalent embodiments. Any simple amendment, equivalent change or modification made to the foregoing embodiments according to the technical essence of this application without departing from the content of the technical solutions of this application shall fall within the scope of the technical solutions of this application.

What is claimed is:

1. A pixel structure of a display array substrate, comprising a plurality of pixel units arranged in an array manner, wherein each of the pixel units comprises a first subpixel, a second subpixel, and a fourth subpixel, and each pixel unit further comprises:
   a first subpixel electrode and a second subpixel electrode, respectively located in the first subpixel and the second subpixel; and
   a fourth subpixel electrode comprising a first pixel electrode, a second pixel electrode, a third pixel electrode, and a fourth pixel electrode located in four areas of the fourth subpixel, respectively, and each of the first pixel electrode, the second pixel electrode, the third pixel electrode, and the fourth pixel electrode are divided into at least two compensation areas configured to correct electrode line widths of the at least two compensation areas, so as to mitigate a brightness difference caused by a variation in slits of the fourth subpixel electrode,
   wherein the first pixel electrode is divided into three compensation areas made up of a first inner-layer pixel electrode, a first intermediate-layer pixel electrode, and a first outer-layer pixel electrode, and electrode line widths of the first inner-layer pixel electrode, the first intermediate-layer pixel electrode, and the first outer-layer pixel electrode, respectively are 80% to 120% of a line width of the first subpixel electrode and the second subpixel electrode.

2. The pixel structure of display array substrate according to claim 1, wherein the second pixel electrode is divided into three compensation areas made up of a second inner-layer pixel electrode, a second intermediate-layer pixel electrode, and a second outer-layer pixel electrode, and electrode line widths of the second inner-layer pixel electrode, the second intermediate-layer pixel electrode, and the second outer-layer pixel electrode, respectively are 80% to 120% of a line width of the first subpixel electrode and the second subpixel electrode.

3. The pixel structure of display array substrate according to claim 1, wherein the third pixel electrode is divided into three compensation areas made up of a third inner-layer pixel electrode, a third intermediate-layer pixel electrode, and a third outer-layer pixel electrode, and electrode line widths of the third inner-layer pixel electrode, the third intermediate-layer pixel electrode, and the third outer-layer pixel electrode, respectively are 80% to 120% of a line width of the first subpixel electrode and the second subpixel electrode.

4. The pixel structure of display array substrate according to claim 1, wherein the fourth pixel electrode is divided into three compensation areas made up of
a fourth inner-layer pixel electrode, a fourth intermediate-layer pixel electrode, and a fourth outer-layer pixel electrode, and electrode line widths of the fourth inner-layer pixel electrode, the fourth intermediate-layer pixel electrode, and the fourth outer-layer pixel electrode, respectively are 80% to 120% of a line width of the first subpixel electrode and the second subpixel electrode.

5. The pixel structure of display array substrate according to claim 1, wherein designs of electrode line widths of the second pixel electrode, the third pixel electrode, and the fourth pixel electrode are the same as a design of the first pixel electrode.

6. The pixel structure of display array substrate according to claim 1, wherein a form of pixel division of the fourth subpixel electrode is a rectangle, a circle or a rhombus.

7. The pixel structure of display array substrate according to claim 1, wherein a form of a compensation area electrode line width is a symmetrical radial pixel electrode with a rectangular outer edge, a symmetrical radial pixel electrode with inserted strip rectangles, a symmetrical radial pixel electrode with a circular outer edge or a symmetrical radial pixel electrode with inserted circles.

8. A liquid crystal display panel, comprising:
a first substrate;
a second substrate, disposed opposite the first substrate; and
a liquid crystal layer, disposed between the first substrate and the second substrate, wherein
the liquid crystal display panel further comprises a pixel structure of display array substrate, disposed between the first substrate and the second substrate, and comprising a plurality of pixel units arranged in an array manner, wherein each of the pixel unit s comprises a first subpixel electrode and a second subpixel electrode, respectively located in the first subpixel and the second subpixel; and a first subpixel, a second subpixel, and a fourth subpixel, and each pixel unit further comprises:
a fourth subpixel electrode, comprising a first pixel electrode, a second pixel electrode, a third pixel electrode, and a fourth pixel electrode located in four areas of the fourth subpixel, respectively, and each of the first pixel electrode, the second pixel electrode, the third pixel electrode, and the fourth pixel electrode are divided into at least two compensation areas configured to correct electrode line widths of the at least two compensation areas, so as to mitigate a brightness difference caused by a variation in a slit of the fourth subpixel electrode,
wherein the first pixel electrode is divided into three compensation areas made up of a first inner-layer pixel electrode, a first intermediate-layer pixel electrode, and a first outer-layer pixel electrode, and electrode line widths of the first inner-layer pixel electrode, the first intermediate-layer pixel electrode, and the first outer-layer pixel electrode, respectively are 80% to 120% of a line width of the first subpixel electrode and the second subpixel electrode.

9. The liquid crystal display panel according to claim 8, wherein the second pixel electrode is divided into three compensation areas made up of a second inner-layer pixel electrode, a second intermediate-layer pixel electrode, and a second outer-layer pixel electrode, and electrode line widths of the second inner-layer pixel electrode, the second intermediate-layer pixel electrode, and the second outer-layer pixel electrode, respectively are 80% to 120% of a line width of the first subpixel electrode and the second subpixel electrode.

10. The liquid crystal display panel according to claim 8, wherein the third pixel electrode is divided into three compensation areas made up of a third inner-layer pixel electrode, a third intermediate-layer pixel electrode, and a third outer-layer pixel electrode, and electrode line widths of the third inner-layer pixel electrode, the third intermediate-layer pixel electrode, and the third outer-layer pixel electrode, respectively are 80% to 120% of a line width of the first subpixel electrode and the second subpixel electrode.

11. The liquid crystal display panel according to claim 8, wherein the fourth pixel electrode is divided into three compensation areas made up of a fourth inner-layer pixel electrode, a fourth intermediate-layer pixel electrode, and a fourth outer-layer pixel electrode, and electrode line widths of the fourth inner-layer pixel electrode, the fourth intermediate-layer pixel electrode, and the fourth outer-layer pixel electrode, respectively are 80% to 120% of a line width of the first subpixel electrode and the second subpixel electrode.

12. The liquid crystal display panel according to claim 8, wherein designs of electrode line widths of the second pixel electrode, the third pixel electrode, and the fourth pixel electrode are the same as a design of the first pixel electrode.

13. The liquid crystal display panel according to claim 8, wherein a form of pixel division of the fourth subpixel electrode is a rectangle, a circle or a rhombus.

14. The liquid crystal display panel according to claim 8, wherein a form of a compensation area electrode line width is a symmetrical radial pixel electrode with a rectangular outer edge, a symmetrical radial pixel electrode with inserted strip rectangles, a symmetrical radial pixel electrode with a circular outer edge or a symmetrical radial pixel electrode with inserted circles.

15. The liquid crystal display panel according to claim 8, further comprising a first polarizer disposed on an outer surface of the first substrate and a second polarizer disposed on an outer surface of the second substrate, wherein a polarization direction of the first polarizer and a polarization direction of the second polarizer are parallel.

16. A pixel structure of display array substrate, comprising a plurality of pixel units arranged in an array manner, wherein each of the pixel units comprises a first subpixel, a second subpixel, and a fourth subpixel, and each pixel unit further comprises:
a first subpixel electrode and a second subpixel electrode, respectively located in the first subpixel and the second subpixel; and a fourth subpixel electrode, comprising a first pixel electrode, a second pixel electrode, a third pixel electrode, and a fourth pixel electrode located in four areas of the fourth subpixel, respectively, and each of the first pixel electrode, the second pixel electrode, the third pixel electrode, and the fourth pixel electrode are divided into at least two compensation areas configured to correct electrode line widths of the at least two compensation areas, so as to mitigate a brightness difference caused by a variation in a slit of the fourth subpixel electrode the first pixel electrode is divided into three compensation areas made up of a first inner-layer pixel electrode, a first intermediate-layer pixel electrode, and a first outer-layer pixel electrode, and electrode line widths of the first inner-layer pixel electrode, the first intermediate-layer pixel electrode, and the first outer-layer pixel electrode, respectively are 80% to 120% of a line width of the first subpixel electrode and the second subpixel electrode;

the second pixel electrode is divided into three compensation areas made up of a second inner-layer pixel electrode, a second intermediate-layer pixel electrode, and a second outer-layer pixel electrode, and electrode line widths of the second inner-layer pixel electrode, the second intermediate-layer pixel electrode, and the second outer-layer pixel electrode, respectively are 80% to 120% of the line width of the first subpixel electrode and the second subpixel electrode;

the third pixel electrode is divided into three compensation areas made up of a third inner-layer pixel electrode, a third intermediate-layer pixel electrode, and a third outer-layer pixel electrode, and electrode line widths of the third inner-layer pixel electrode, the third intermediate-layer pixel electrode, and the third outer-layer pixel electrode, respectively are 80% to 120% of the line width of the first subpixel electrode and the second subpixel electrode; and the fourth pixel electrode is divided into three compensation areas made up of a fourth inner-layer pixel electrode, a fourth intermediate-layer pixel electrode, and a fourth outer-layer pixel electrode, and electrode line widths of the fourth inner-layer pixel electrode, the fourth intermediate-layer pixel electrode, and the fourth outer-layer pixel electrode, respectively are 80% to 120% of the line width of the first subpixel electrode and the second subpixel electrode.

\* \* \* \* \*